United States Patent [19]

Bresina et al.

[11] Patent Number: 5,482,223
[45] Date of Patent: Jan. 9, 1996

[54] REUSABLE FILM CANISTER AND METHOD OF REUSING A FILM CANISTER

[75] Inventors: Timothy B. Bresina, Shoreview; Virgil L. Peterson, Coon Rapids, both of Minn.

[73] Assignee: Minnesota Mining and Manufacturing Company, St. Paul, Minn.

[21] Appl. No.: 183,028

[22] Filed: Jan. 18, 1994

[51] Int. Cl.⁶ .......................... B65H 16/02; G03B 17/26
[52] U.S. Cl. .................... 242/348.4; 242/588.6; 242/598.3; 220/326
[58] Field of Search ................. 242/348, 348.1, 242/348.2, 348.3, 348.4, 347.2, 612, 588.6, 588.5, 598.6, 613, 598.3, 599.3; 354/275; 220/326; 206/1.5

[56] References Cited

U.S. PATENT DOCUMENTS

| | | | |
|---|---|---|---|
| 3,104,846 | 9/1963 | Ringle | 242/348.4 |
| 3,536,276 | 10/1970 | Bundschuh et al. | 242/348 X |
| 3,771,687 | 11/1973 | Krtous | 220/31 S |
| 4,093,142 | 6/1978 | Mindell | 242/348.1 |
| 4,334,750 | 6/1982 | Fichter | 242/348.1 X |
| 4,420,120 | 12/1983 | Raymond . | |
| 4,597,658 | 7/1986 | Buelens et al. | 354/275 |
| 4,671,409 | 6/1987 | Espy | 206/397 |
| 4,732,271 | 3/1988 | Solyntjes | 206/316 |
| 5,004,176 | 4/1991 | Niedospial | 242/348.4 X |
| 5,053,795 | 10/1991 | Wyman | 354/275 |
| 5,193,759 | 3/1993 | Bigelow et al. | 242/348.4 |
| 5,251,839 | 10/1993 | Zander et al. | 242/348 |
| 5,374,007 | 12/1994 | Murison | 242/598.3 X |
| 5,380,108 | 1/1995 | Fukahori et al. | 242/348 X |

FOREIGN PATENT DOCUMENTS 8800918  2/1988  WIPO .................................. 242/348

*Primary Examiner*—John M. Jillions
*Attorney, Agent, or Firm*—Gary L. Griswold; Walter N. Kirn; William D. Bauer

[57] ABSTRACT

A reusable film canister for receiving and holding film spirally wound on a spool and method for reusing a film canister. The core of the spool extends further on one axial direction from the roll of film than the other axial direction. First and second partial shells are adapted to be mated together to form a cavity receiving the film. The first and second partial shells have at least one projecting tab. The tab and second partial shell having a mating peg and opening adapted to releasably engage with each other and adapted to secure the first and second shells together when so engaged. The tab is flexible to allow the tab to slide over the peg. The mating surfaces of the tab and the peg are angled with respect to each in order to facilitate mating of the tab with the peg. The mating surface of the tab and the mating surface of the peg are both sloped relative to the orientation of mating. The tab is disengaged from the peg. The film canister is opened by separating the first partial shell from the second partial shell. The empty or partially used spool is removed from the cavity. Fresh film on a spool is inserted into the cavity. The tab slide over peg or may be flexed to allow engagement of the tab with the peg. The tab is engaged with the peg to secure the first partial shell with the second partial shell to form a closed film canister.

5 Claims, 10 Drawing Sheets

REUSABLE FILM CANISTER AND METHOD OF REUSING A FILM CANISTER

TECHNICAL FIELD

The present invention relates generally to containers for photosensitive media and, more particularly, to reusable film cartridges.

BACKGROUND OF THE INVENTION

Film, or other photosensitive media, is commonly used in a number of environments ranging from the photographic industry to more commercial uses such as micrographic imagers. It is in the commercial industry, particularly in the use of what is known as laser COM film that the present invention has particular utility.

Film is commonly available in canisters which provide an easy mechanism for the user to handle the film without being in a safe light environment such as red light or light tight dark room conditions, i.e., in an environment so sufficiently devoid of light that the film will not be appreciably exposed. The laser COM film may be purchased, or supplied, from the film manufacturer or distributor already contained in a canister suitable for insertion directly into the laser imager using the film. Typically, the film is configured inside the canister on a roll.

Typically the canister will contain enough film for a plurality of images, e.g., an entire roll of images. When the film is entirely dispensed or used, or earlier if desired by the user, the film must be replaced by the user. The canister containing the spent roll can be simply removed from the machine and a canister containing fresh film can be installed in its place.

The used canister must either then be discarded or reloaded with fresh film, either on the premises by the user or customer or elsewhere by another party. Usually, the canister is tightly closed and secured to provide a light tight environment for the film. Typically, the canister is discarded since it otherwise would be broken in disassembly and removal of the spent roll and must be discarded.

U.S. Pat. No. 4,671,409, Espy, discloses a light tight film canister disposed to hold rolls of microfilm used in reader/printers. The film canister disclosed in the Espy patent is press fit and snapped together in a manner which will not allow disassembly and reuse of the canister. The canister disclosed in Espy is configured to hold rolls of microfilm used in reader/printers, includes a tubular sleeve closed at both ends by opaque end caps. The end caps are lockingly interconnected by a rigid tie bar that extends between the end caps through the roll of film. This tie bar includes a pair of resilient fingers on each of its opposite ends. During assembly of the canister, these resilient fingers are deformed under pressure and snapped into central apertures in the end caps.

There is a problem, however, on what to do with the used film canister. Typically, used film canisters are simply discarded. This, however, results in a significant cost and a waste of precious earth resources as well as creating a disposal hazard. Thus, it would be desirable to be able to reuse the canister by loading the canister with fresh film and returning the reused and refilled canister to use.

Canisters have been constructed which have been intended for reuse. For example, U.S. Pat. No. 3,771,687, Krtous, discloses a cylindrically shaped cartridge for retaining photographic film in coiled form. The cartridge is open ended and includes a pair of parallel side walls. The edges of each of the side walls define opposing latching channels. The outwardly disposed surface of each of the walls defines a pair of spaced recesses positioned adjacent the edge of the respective wall. A cover is hinged to the cartridge housing and each side of the cover carries a pair of ears for engagement with the recesses. Formed at each side of the cover is a flange for locking engagement with its respective channel. However, the canister disclosed in Krtous is not light tight and does not have need to be refilled in a dark room environment.

Other canisters have been constructed which are intended for reuse and which must be refilled in a dark room environment.

For example, U.S. Pat. No. 4,420,120, Raymond, discloses a cassette including a housing formed of a pair of mating shells which join to define a cylindrical chamber to confine sheet photographic materials, such as negative active film, emulsified paper and the like. The shells are hingedly joined together, and have latches which fasten them together in light-sealing engagement. A trough, formed of two mating parts, is provided for dispensing the photographic materials therethrough from the chamber. One of the mating parts is a fixed portion of one of the shells, and the other thereof is hingedly joined to the other of the shells. The mating parts of the trough also have latches which fasten them together.

In another example, U.S. Pat. No. 4,597,658, Buelens et al, discloses a light-tight cassette suitable for holding a roll of web-like light-sensitive photographic material wound around a core and for dispensing the photographic material through a slit provided in the cassette which is in the form of a box. The box consists of a hollow shell portion whose wall at three of its corners is at least partly and locally realized as a double wall and two end closure walls which are secured to the shell portion by perforations provided in the outer wall of the double wall portions of the shell and cooperating detent fingers on the end closure walls. The inner wall of the double wall portions of the shell prevents light from intruding into the cassette through perforations in the outer shell wall and makes the cassette perfectly light-tight.

However, these canisters as can be seen from their complex construction are difficult to disassemble and reassemble inside or outside of a dark room environment.

One mechanism which has been used in the past for reusable film cartridges is to have a canister in two pieces with the two pieces being held together with removable pins. The removable pins provide a solid locking mechanism for the canister pieces. However, the removable pins create other problems by creating extra pieces, i.e., the pins themselves, which can be lost defeating the reusability of the canisters. Further, the removable pin arrangement is difficult to use. Disassembly/assembly is made even more difficult in dark room conditions where visible lighting is poor.

U.S. Pat. No. 5,053,795, Wyman, assigned to the assignee of the present invention, discloses an opaque reusable cartridge for storing and dispensing light sensitive web material from a roll. The cartridge is constructed of a right angular sexahedron box made from a top section and a bottom section which are hingedly attached. The cartridge so assembled has limited means for disassembly, making the cartridge difficult to disassemble and reassemble in a dark room environment.

SUMMARY OF THE INVENTION

The present invention provides a film canister which is easily reusable and can be reloaded especially in a dark room environment. The snap fit design of the first and second partial shells with a projecting tab having a receptacle and a mating peg allows easy disassembly, reloading and reassembly even in dark room lighted conditions.

In one embodiment, the present invention is a reusable film canister for receiving and holding film. First and second partial shells are adapted to be mated together to form a cavity receiving the film. The first and second partial shells have at least one projecting tab containing a receptacle. The second partial shell has at least one peg adapted to engage with the receptacle of the tab and adapted to secure the first and second shells together when so engaged. The tab is flexible to allow the tab to slide over the peg.

In a preferred embodiment, the tab has a mating surface intended to engage the peg and the peg has a mating surface intended to engage the tab, the mating surfaces of the tab and the peg being angled with respect to each other in order to facilitate mating of the tab with the peg.

In a preferred embodiment, the tab has an unflexed position and has a point of maximum flexure beyond which the tab would not return to near the unflexed position and wherein the second partial shell has a rib which prevents flexure of the tab beyond the point of maximum flexure when the first partial shell and the second partial shell are engaged.

In a preferred embodiment, the mating surface of the tab and the mating surface of the peg are both sloped relative to the orientation of mating.

In a preferred embodiment, the tab has a point of flexure when flexing during mating with the peg and wherein the tab has a half slot which shifts the location of flexure of the tab away from the opening.

In a preferred embodiment, the first partial shell has two of the tabs, located on opposite sides of the first partial shell and wherein the second partial shell has two of the pegs each adapted to engage the two of the tabs of the first partial shells.

In a preferred embodiment, the cavity is light tight.

In another embodiment, the present invention is a reusable film canister adapted to receive a spool having a cylindrical core having a roll of film spirally wound thereon, the core of the spool extending further on one axial direction from the roll of film than the other axial direction. First and second partial shells are adapted to be mated together to form a cavity receiving the spool and to form a media exit slot allowing the roll of film to exit the cavity. The first and partial shells are hingedly attached on one side. The first and second partial shells have mating latch means, located near an opposite side, for releasably securing the first and second shells together. The first and second partial shells accommodate the spool in one usable orientation only.

The present invention also provides a method of reusing a film canister having first and second partial shells adapted to be mated together to form a cavity receiving the film; the first and second partial shells having at least one tab, the tab having a receptacle; the second partial shell having at least one peg adapted to engage with the opening of the tab and adapted to secure the first and second shells together when so engaged; tab being flexible to allow the tab to slide over the peg, the tab of the first partial shell having a mating surface intended to engage the peg and the peg having a mating surface intended to engage the tab; the mating surface of the tab and the mating surface of the peg being sloped with respect to each in order to facilitate mating of the tab with the peg. The tab is flexed to allow disengagement of the tab from the peg. The tab is disengaged from the peg. The film canister is opened by separating the first partial shell from the second partial shell. The spent roll is removed from the cavity. Fresh film on a spool/roll is inserted into the cavity. The tab is flexed to allow engagement of the tab with the peg. The tab is engaged with the peg to secure the first partial shell with the second partial shell to form a closed film canister.

BRIEF DESCRIPTION OF THE DRAWINGS

The foregoing advantages, construction and operation of the present invention will become more readily apparent from the following description and accompanying drawings in which.

DETAILED DESCRIPTION OF THE PREFERRED EMBODIMENTS

Figure 1:
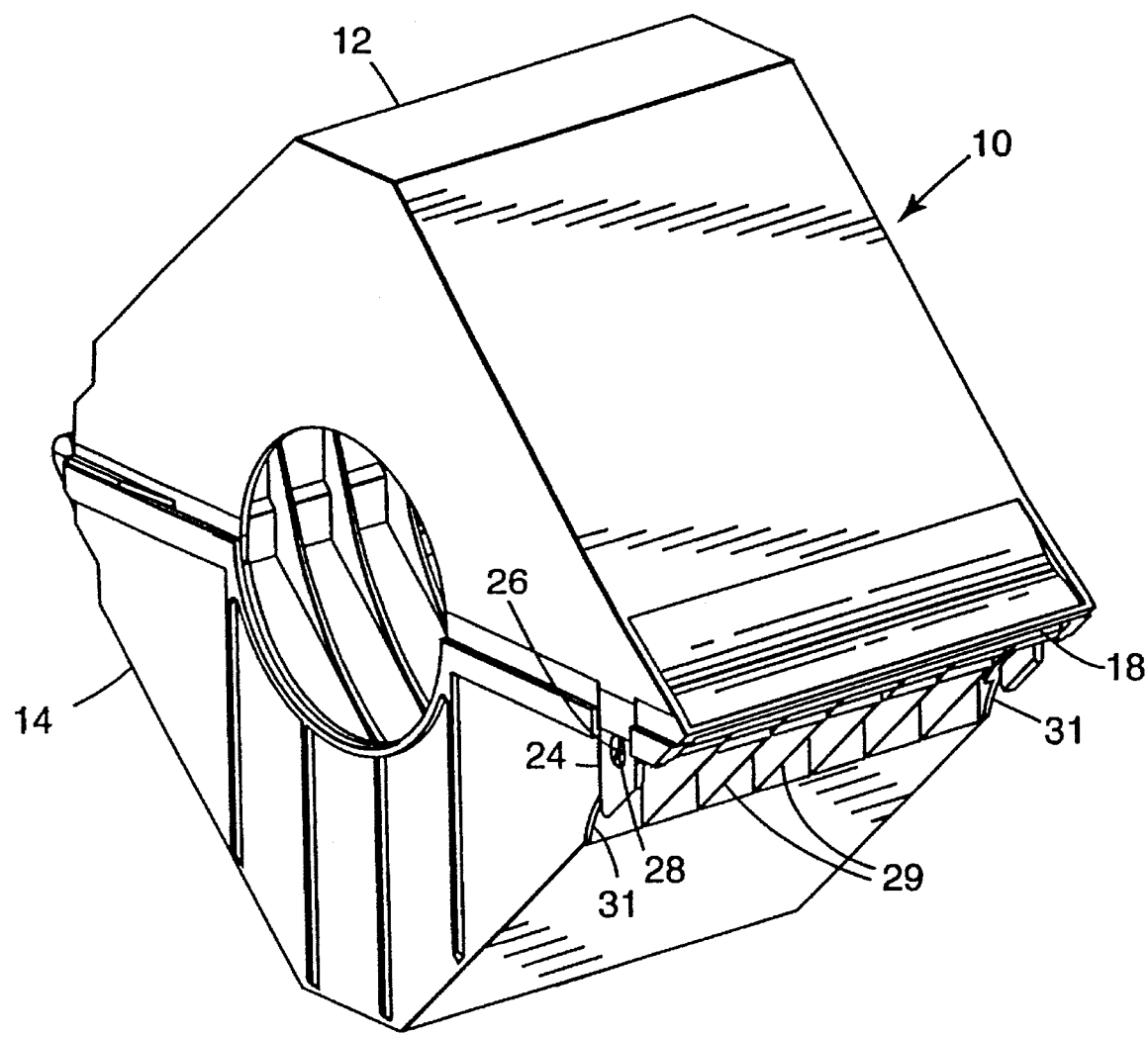
FIG. 1 is an isometric view of a canister constructed in accordance with the present invention.
Figure 2:
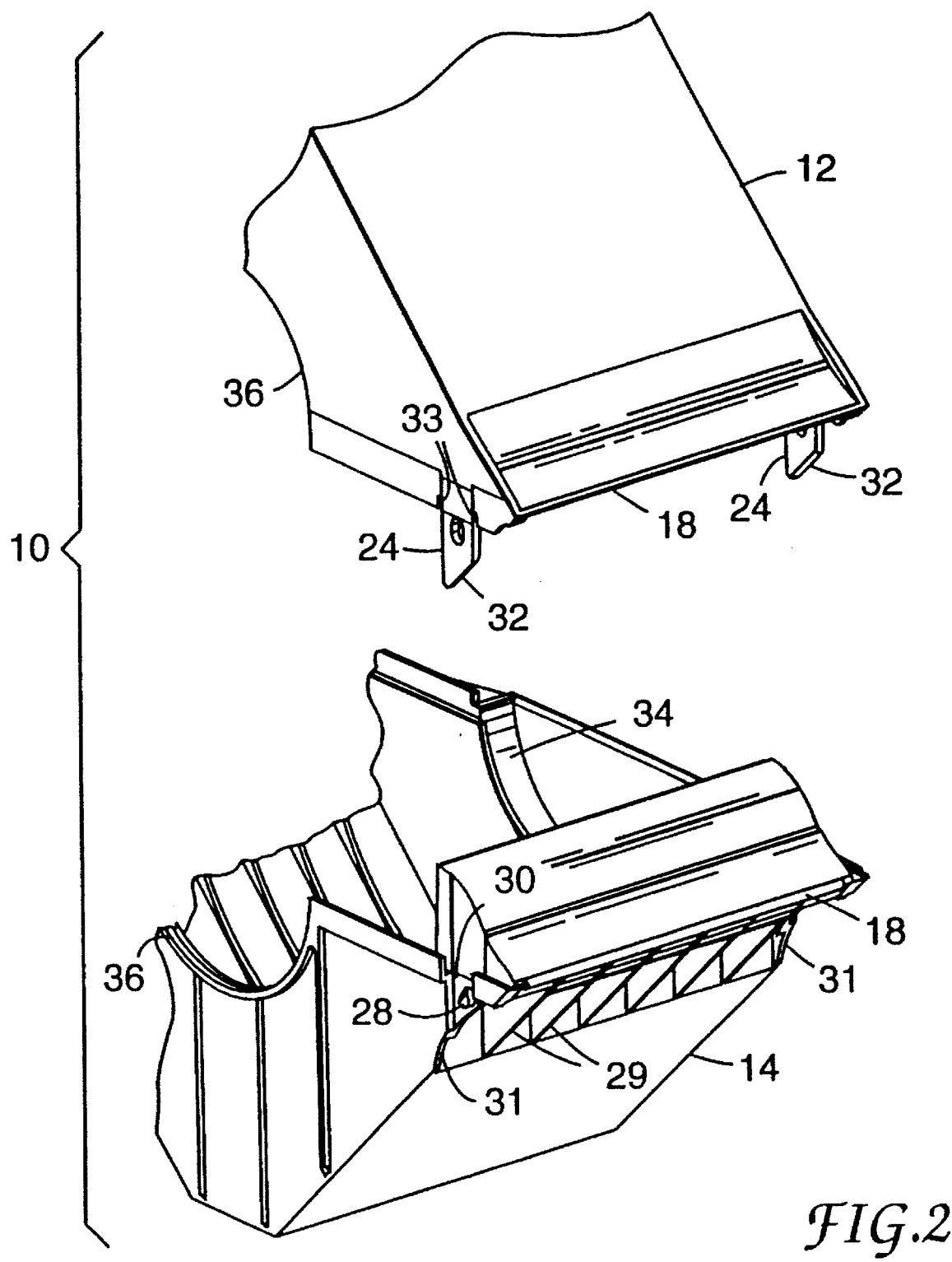
FIG. 2 is an expanded view of a portion of the canister illustrated in FIG. 1 showing the mating portions of the canister in an open position.
Figure 3:
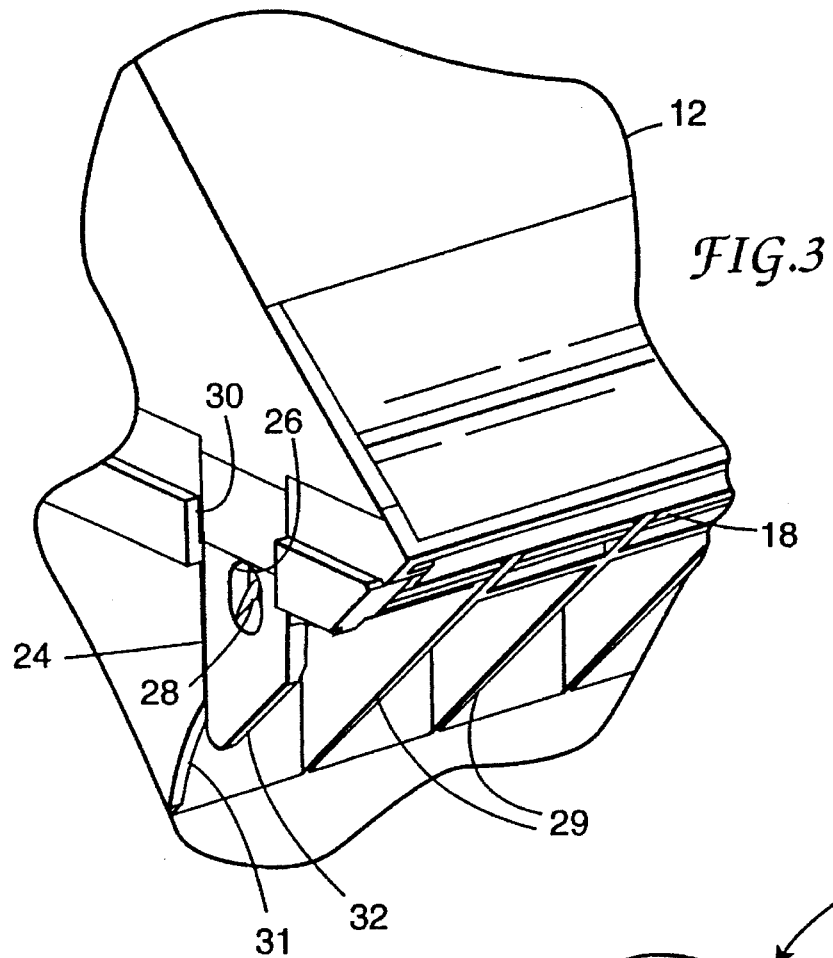
FIG. 3 is an enlarged view of a portion of the canister illustrated in FIG. 1 showing the mating portions of the canister in the closed position.

Canister 10, as illustrated in FIGS. 1, 2, 3 and 4, is formed of two partial shells 12 and 14 forming an enclosed "clam shell" canister. Each partial shell 12, 14 is opaque. Partial shell 12 and partial shell 14 are joined with a hinge 16. In closed position as illustrated in FIG. 1, canister 10 is light-tight with partial shells 12 and 14 forming a light-tight seal at their juncture. A roll of light sensitive film (not shown) may be inserted radially into canister 10 when canister 10 is in an open position. A light-tight seal at media exit slot 18 is provided by overlapping layers of black plush, e.g., felt, material. In one embodiment, canister 10 is configured to hold rolls of dry silver film used in microfilm com recorders.

The light-tight seal at hinge 16 is formed by lips 20, 22 which overlap with each other when partial shells 12 and 14 are in the closed position.

Tab 24 having an opening 26 therein extends from at least one side, preferably both sides, of partial shell 12 toward partial shell 14. Peg 28 located on partial shell 14 mates with opening 26 securing partial shell 12 with partial shell 14 locking canister 10 in the closed position. Slot 30 in the side of partial shell 14 allows tab 24 to slide easily along the side of partial shell 14 to mate with peg 28.

Tab 24 has a tapered end 32 which allows tab 24 to easily slide over peg 28. Preferably, the end of peg 28 is tapered so that peg 28 is shorter on the side of peg 28 which first engages tab 24 when canister 10 is closed and longer on the opposite side. This additionally allows tab 24 to easily slide over peg 28 as canister 10 is closed.

Half slots 33 formed into first partial shell 12 where tab 24 is attached to first partial shell 12 allow tab 24 to flex more easily and shifts flexing away from hole 26.

Tab 24 is preferably constructed from a material which is somewhat resilient to allow tab 24 to bend slightly outward as canister 10 is closed. As canister 10 is closed and tab 24 encounters peg 28, tab 24 bends slightly outward allowing the end of tab 24 to pass over the end of peg 28. When peg 28 encounters opening 26 in tab 24, tab 24 resiliently returns to its original alignment causing peg 28 to snap into opening 26 and locking canister 10 in the closed position.

A series of stiffening ribs 29 both provide rigidity to partial shell 14 and provide a flush surface with which to mount canister 10 in the imaging apparatus (not shown). Outside ribs 31 are cut away from this flush surface. Tab 24 extends beyond the edge of rib 31 allowing the user of canister 10 to easily locate and flex tab 24, or both tabs 24 if two tabs 24 are utilized, outward and over peg 28, or pegs 28, unlocking canister 10 and allowing partial shell 12 to open from partial shell 14. Simply by flexing tabs 24 outward and pushing tabs 24 forward, canister 10 can be opened.

Figure 5:
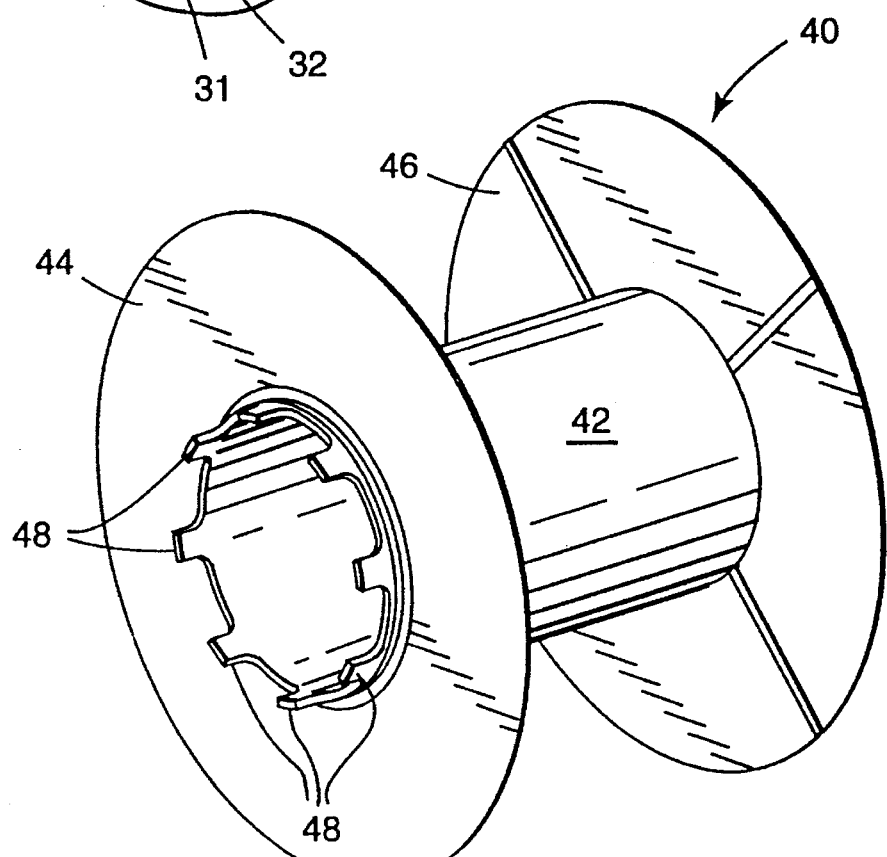
FIG. 5 is an isometric view of an empty spool which can utilized in conjunction with the canister illustrated in FIGS. 1 and 7.
Figure 4:
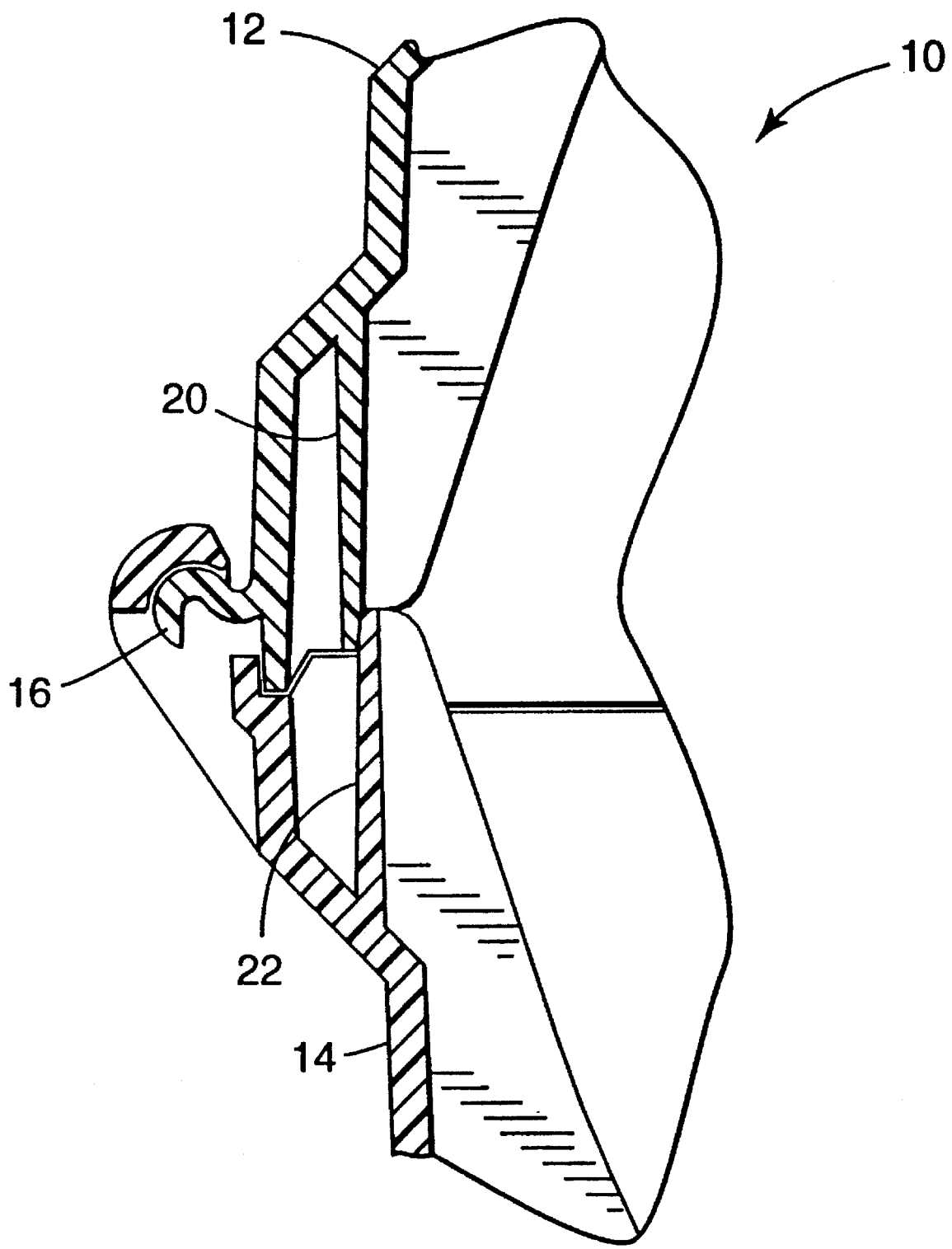
FIG. 4 is a cross-sectional view of the hinged portion of the canister illustrated in FIG. 1.
Figure 6:
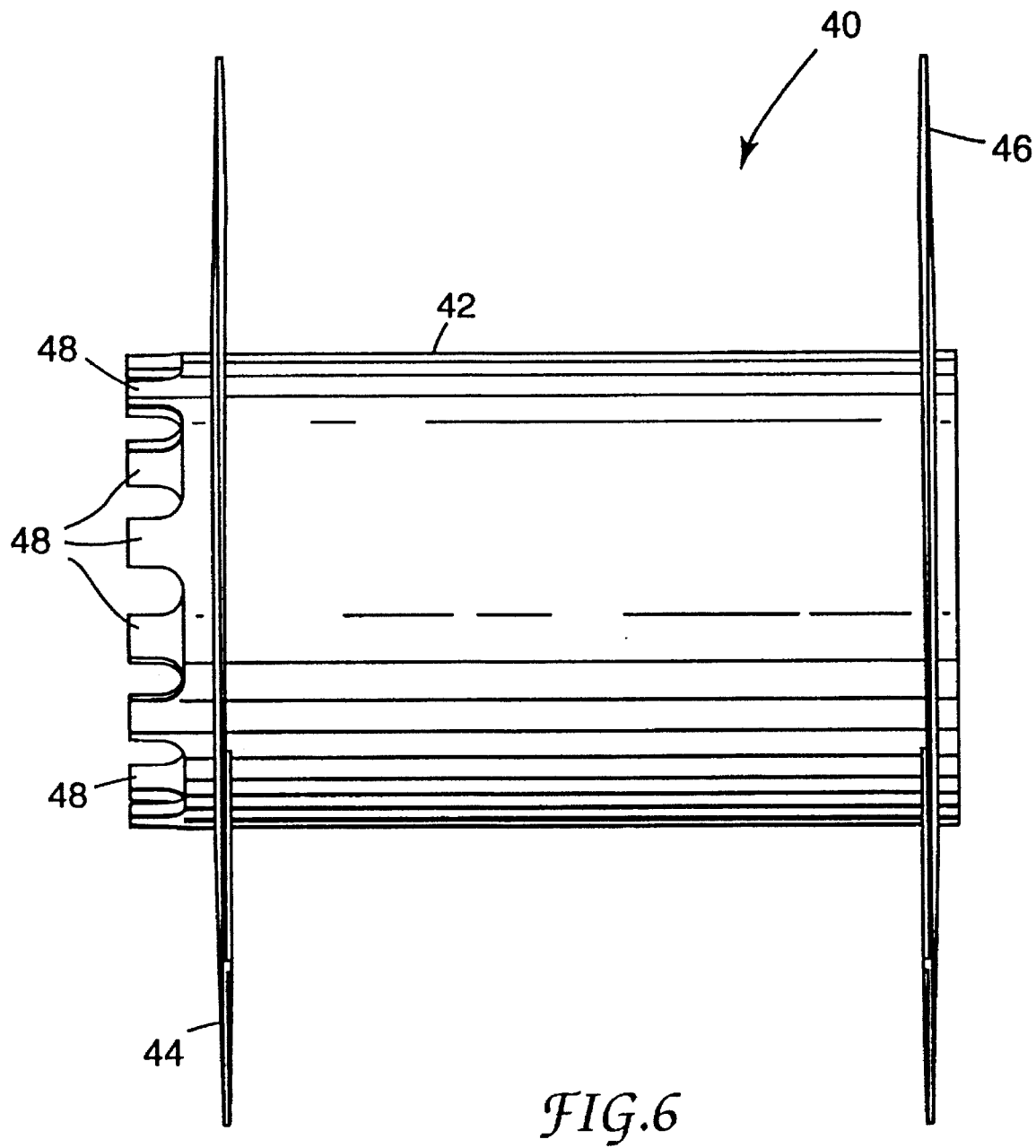
FIG. 6 is an elevational view of the spool illustrated in FIG. 5.

FIGS. 5 and 6 illustrate a spool 40 which may be used in canister 10 illustrated in FIGS. 1 through 4. Spool 40 has a central cylindrical core 42 around which film (not shown) is conventionally spirally wound. Each axial end of core 42 has a radial flange 44 and 46 which serves to protect the film wound around core 42 onto spool 40. Flange 44 has a series of projections 48 extending radially from the outside edge of flange 44.

Spool 40 containing a roll of photosensitive film (not shown) can be placed inside canister 10. Circular recess 34 and circular edge 36 are formed into the end walls of partial shells 12, 14. Preferably, flange 44 and flange 46 rest inside recess 34 and edge 36, respectively, with core 42 resting upon recess 34 and edge 36 physically locating spool 40 within canister 10 and allowing spool 40 to rotate while inside canister 10. Projections 48 fit into recess 34 when spool 40 is correctly axially oriented. However, if spool 40 were reversed end for end, projections 48 would extend beyond edge 36 and prevent canister 10 from being inserted into the imaging apparatus (not shown).

Constructed in this manner, canister 10 containing an empty spool 40 can be brought into a dark room. In low light or no light, canister 10 may be opened by finding the ends of tabs 24 (easily allowed by outside ribs 31) and flexing tabs 24 outward. So flexed, tabs 24 will slide over pegs 28 unlocking canister 10. Partial shell 12 may then be separated from partial shell 14 pivoting around hinge 16. With canister 10 open, spool 40, either empty or containing a partial roll of photosensitive film, may be removed from canister 10. A spool 40 containing a fresh roll of photosensitive film may then be easily inserted into open canister 10. Canister 10 may then be reclosed by pivoting partial shell 12 and partial shell 14 around hinge 16 bringing tabs 24 in engagement with pegs 28 locking canister 10 in the closed position. Canister 10, containing fresh film, may then be reused.

Figure 7:
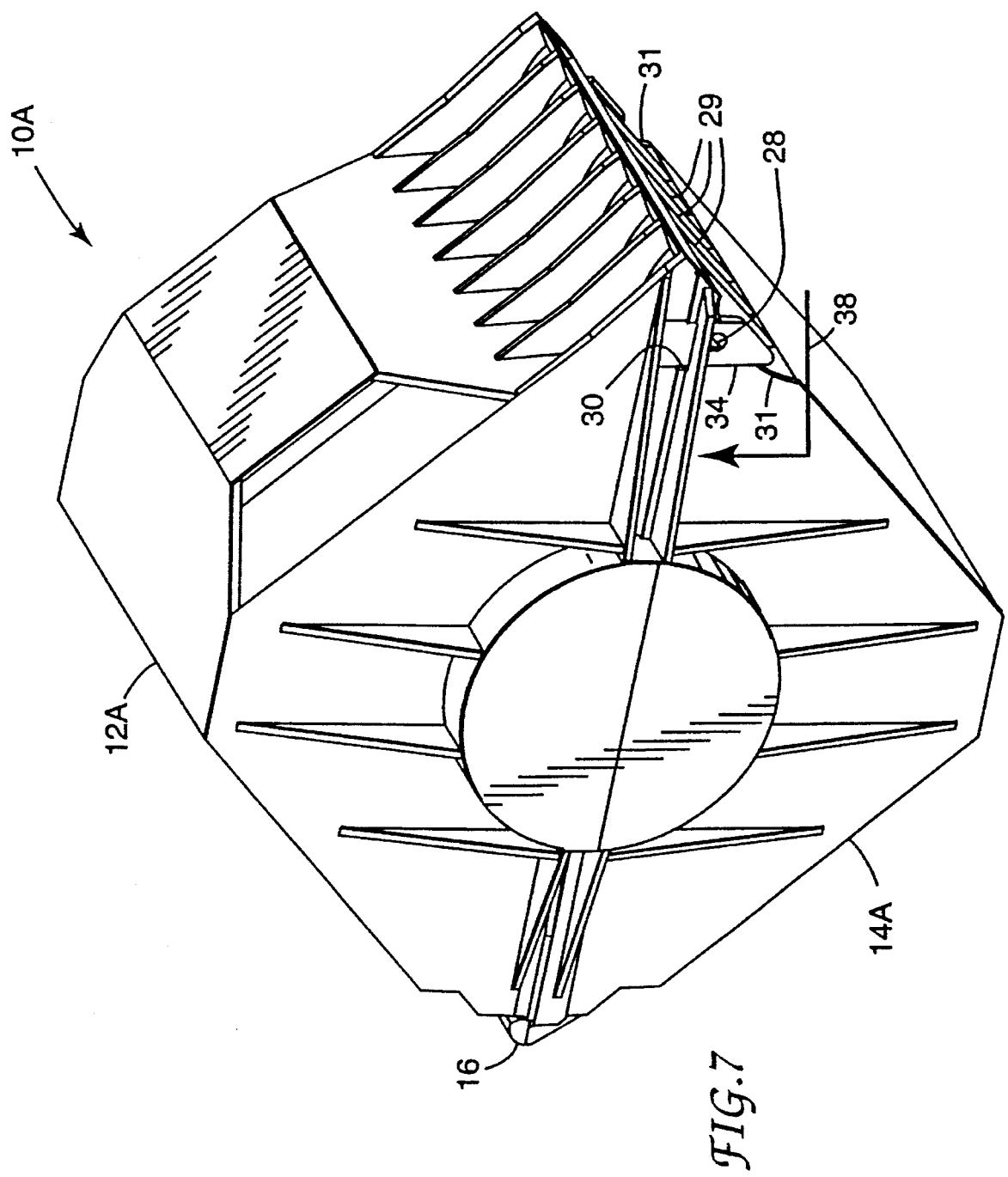
FIG. 7 is an isometric view of an alternative embodiment of a canister constructed in accordance with the present invention.
Figure 8:
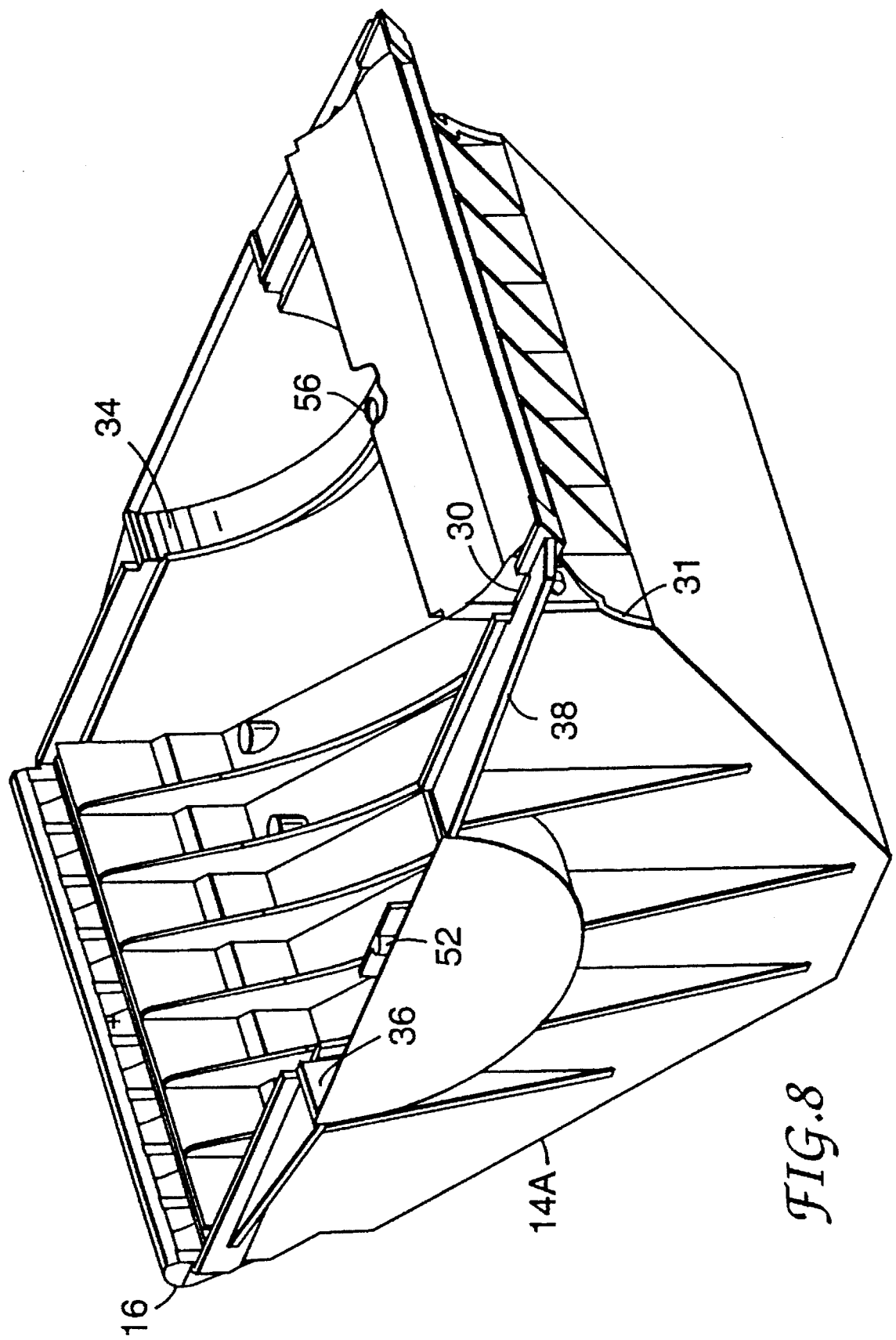
FIG. 8 is an isometric view of the second partial shell of the canister illustrated in FIG. 7.
Figure 9:
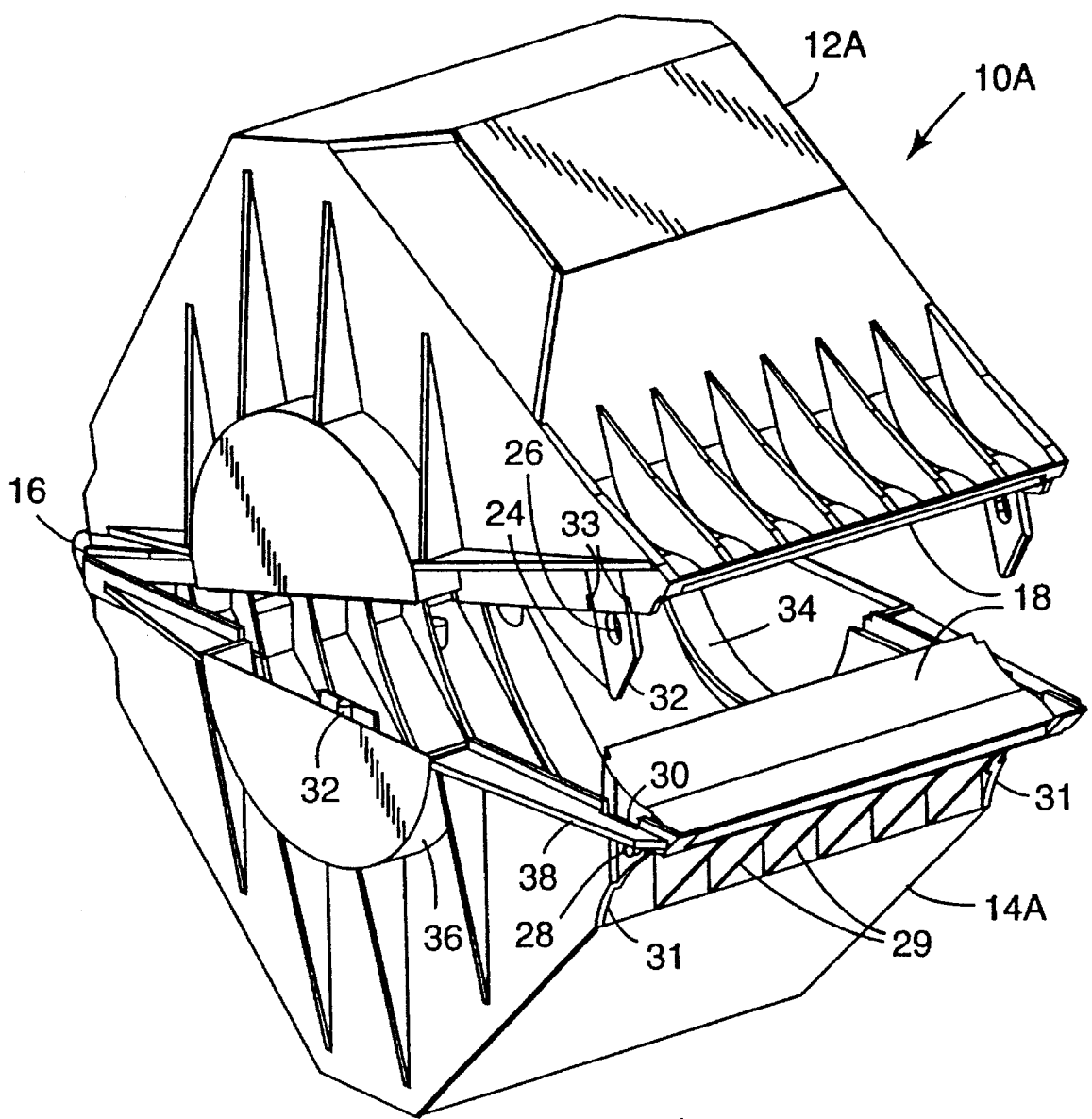
FIG. 9 is an isometric view of the canister illustrated in FIG. 7 in an open position.

An alternative canister 10A is illustrated in FIGS. 7 through 9. Canister 10A is constructed of partial shell 12A and partial shell 14A similar to canister 10 and partial shells 12 and 14 illustrated in FIGS. 1, 2, 3 and 4. Partial shell 12A and partial 14A in FIG. 5 have a substantial number of stiffening ribs to provide canister 10A with substantial rigidity. In addition, partial shell 14A contains a rib 38 which at least partially covers slot 30. Rib 38, which may be molded into partial shell 14, prevents the user of canister 10A from flexing tab 24 beyond its maximum flex point. Preventing too much flexure increases the life of the snap latch feature of tab 24 and peg 28.

Canister 10A contains a recess 34 similar to recess 34 in canister 10. Canister 10A, however, in order to accommodate the imaging apparatus into which it is to be placed, contains a recess 36 on the opposite axial end. It is undesirable, however, to allow spool 40 to be inserted in more than a single orientation. Element 52 blocks the entry of projections 48 on spool 40 from entering recess 36. Thus, spool 40 can be inserted with projections facing recess 34 but can not be inserted with projections 48 facing recess 36. Thus, the single orientation of spool 40 is preserved.

Figure 10:
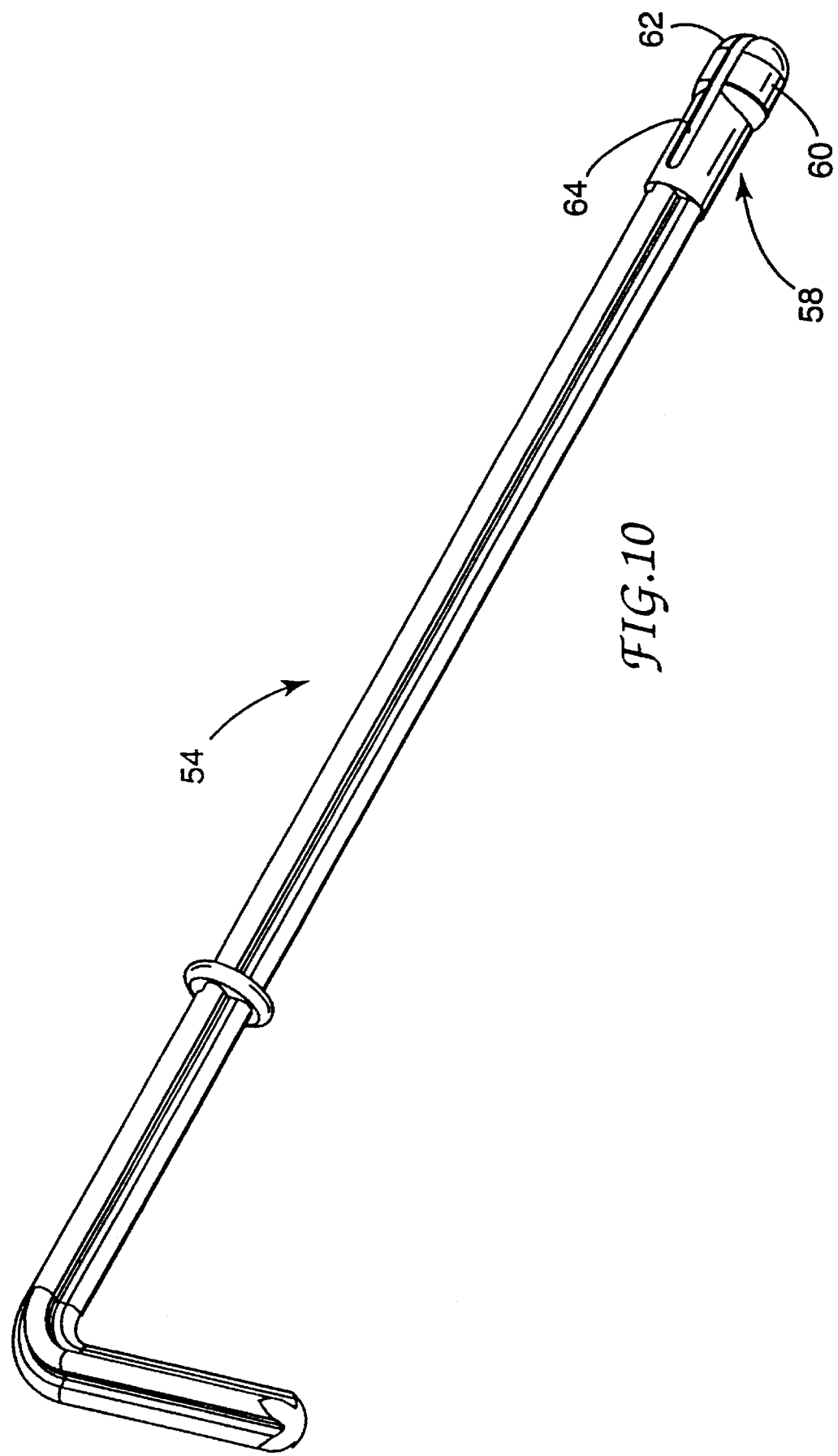
FIG. 10 is an isometric view of an anti-clock spring rod which can be utilized in conjunction with the canister illustrated in FIG. 7 and the spool illustrated in FIGS. 5 and 6.

Once spool 40 is inserted into canister 10A and first partial shell 12A and second partial shell 14A are closed, end 58 of an anti-clock spring rod 54 illustrated in FIG. 10 may be inserted through hole 56 in second partial shell 14A and a corresponding hole (not visible) in first partial shell 12A. Anti-clock spring rod 54 fits between projections 48 of spool 40 and prevents rotation of spool 40 during shipping and storage of canister 10A. Clothes-pin-like features at end 58 of anti-clock spring rod 54 can be inserted through hole 56 and can retained therein. Enlarged end pieces 60 and 62 are slightly larger than hole 56 retaining anti-clock spring rod 54 to be held in hole 56. Slot 64 allows end pieces 60 and 62 to be compressed toward each other as anti-clock spring rod 54 is inserted or withdrawn through hole 56. Anti-clock spring rod 54 can also be utilized with canister 10 in the same manner.

Figure 11:
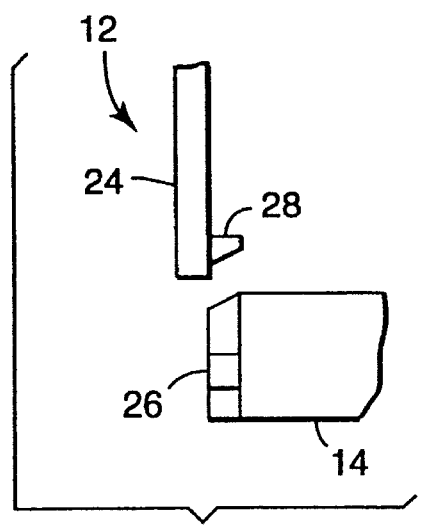
FIG. 11 is a partial side view of an alternative latching mechanism used with any of the canisters illustrated.
Figure 12:
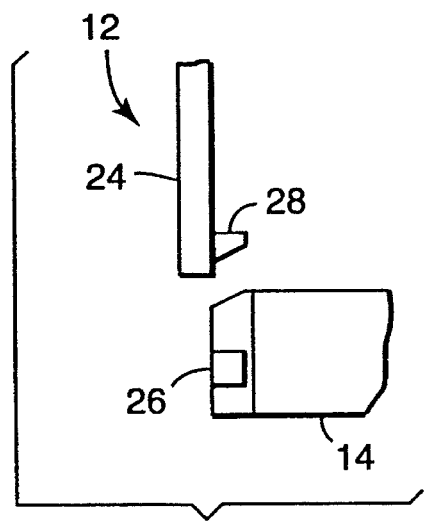
FIG. 12 is a partial side view of another alternative latching mechanism used with any of the canisters illustrated.
Figure 13:
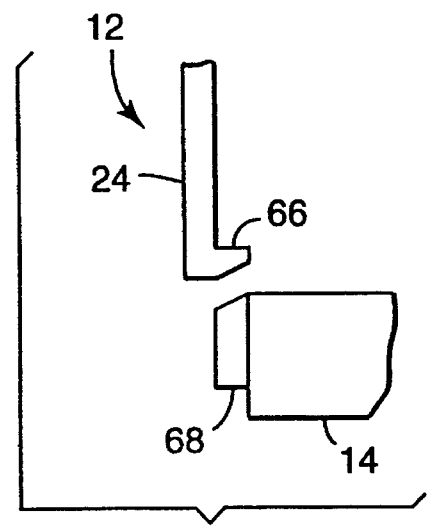
FIG. 13 is a partial side view of another alternative latching mechanism used with any of the canisters illustrated.

While canister 10 and 10A has been illustrated with a hole 26 located in tab 24 of first partial shell 12 and 12A to mate with peg 28 in second partial shell 14 and 14A it is recognized that alternative embodiments are possible. As an example illustrated in FIG. 11, the location of peg 28 and hole 26 may be reversed. That is, peg 28 may be located on tab 24 of first partial shell 12 and 12A and hole 26 may be located on a non-light-tight sensitive portion of second partial shell 14 and 14A. Or, hole 26 on second partial shell 14 and 14A may not completely pierce second partial shell 14 and 14A but may be a detent as illustrated in FIG. 12. Still further, instead of a mating peg 28 and hole 26, a first hook 66 may be located on tab 24 and a second mating hook 68 may be located on second partial shell 14 and 14A. Of course, other releasable mating embodiments are also possible.

The method of reusing canister 10 and 10A is performed by flexing tab 24 to allow disengagement of tab 24 from peg 28. Tab 24 is then disengaged from peg 28. Canister 10 and 10A is then opened by separating partial shell 12 and 12A from partial shell 14 and 14A. The spool is removed from the cavity of canister 10 and 10A. Fresh film is inserted into the cavity of canister 10 and 10A. Tab 24 is flexed to allow engagement of tab 24 with peg 28. Tab 24 is engaged with peg 28 to secure partial shell 12 and 12A with partial shell 14 and 14A to form a closed canister 10 and 10A. Optionally, tab 24 may be flexed during engagement with peg 28 during mating and closure of canister 10 and 10A.

Thus, it can be seen that there has been shown and described a novel invention as described above. It is to be recognized and understood, however, that various changes, modifications and substitutions in the form and the details of the present invention may be made by those skilled in the art without departing from the scope of the invention as defined by the following claims.

What is claimed is:

1. A reusable film canister for receiving and holding film, comprising:
    first and second partial shells adapted to be mated together to form a cavity receiving said film;
    said first partial shell having at least one projecting tab, said tab containing a receptacle;
    said second partial shell having at least one peg adapted to engage with said receptacle of said tab and adapted to secure said first and second shells together when so engaged;
    said tab being flexible to allow said tab to slide over said peg;
    wherein said tab has a mating surface intended to engage said peg and said peg has a mating surface intended to engage said tab, said mating surfaces of said tab and said peg being angled with respect to each other in order to facilitate mating of said tab with said peg;
    wherein said tab has an unflexed position, has a point of maximum flexure beyond which said tab would not return to near said unflexed position and wherein said second partial shell has a rib which prevents flexure of said tab beyond said point of maximum flexure when said first partial shell and said partial shell are engaged.

2. A light tight reusable film canister for receiving and holding film, comprising:
    first and second partial shells adapted to be mated together to form a cavity receiving said film;
    said first partial shell having at least one projecting tab, said tab containing a receptacle;
    said second partial shell having at least one peg adapted to engage with said receptacle of said tab and adapted to secure said first and second shells together when so engaged;
    said tab being flexible to allow said tab to slide over said peg;
    wherein said mating surface of said tab and said mating surface of said peg are both sloped relative to the orientation of mating;
    wherein said tab has a point of flexure when flexing during mating with said peg and
    wherein said tab has a half slot which shifts the location of flexure of said tab away from said receptacle.

3. A light tight reusable film canister adapted to receive a Spool having a cylindrical core having a roll of film spirally wound thereon, said core of said spool extending further in one axial direction from said roll of film than in the other axial direction, comprising:
    first and second partial shells adapted to be mated together to form a cavity receiving said spool and forming a media exit slot allowing said roll of film to exit said cavity;
    said first and partial shells being hingedly attached on one side;
    said first and second partial shells having mating latch means located near an opposite side for releasably securing said first and second shells together;
    said first and second partial shells accommodating said spool in one usable axial orientation only;
    wherein at least one of said first partial shell and said second partial shell is constructed such that said core of said spool extending further in said one axial direction prevents said spool from being loaded into said canister.

4. A reusable film canister as in claim 3 wherein at least one of said first partial shell and said second partial shell further comprises a member on one side of said canister interferes with said core of said spool in the other axial orientation.

5. A method of reusing a light tight film canister having first and second partial shells adapted to be mated together to form a cavity receiving said film on a spool; said first and second partial shells having at least one tab, said tab and said second partial shell having a mating peg and hole adapted to releasably engage each other and adapted to secure said first and second shells together when so engaged; tab being flexible to allow said tab to slide over said peg, said tab having a mating surface intended to engage said peg and said peg having a mating surface intended to engage said tab; said mating surface of said tab and said mating surface of said peg being sloped with respect to each in order to facilitate mating of said tab with said peg, said tab having an unflexed position, having a point of maximum flexure beyond which said tab would not return to near said unflexed position and said second partial shell having a fib which prevents flexure of said tab beyond said point of maximum flexure when said first partial shell and said second partial shell are engaged; comprising the steps of:
    flexing said tab to allow disengagement of said tab from said peg;
    disengaging said tab from said peg;
    opening said film canister by separating said first partial shell from said second partial shell;
    removing said spool from said cavity;
    inserting fresh film on said spool into said cavity;
    flexing said tab to allow engagement of said tab with said peg to not beyond said point of maximum flexure; and
    engaging said tab with said peg to secure said first partial shell with said second partial shell to form a closed film canister.

\* \* \* \* \*

UNITED STATES PATENT AND TRADEMARK OFFICE
CERTIFICATE OF CORRECTION

PATENT NO. : 5,482,223
DATED : January 9, 1996
INVENTOR(S) : Bresina et al.

It is certified that error appears in the above-indentified patent and that said Letters Patent is hereby corrected as shown below:

Col. 8, line 41, delete "fib" and insert --rib--.

Col. 8, line 2, delete "Spool" and insert --spool--.

Signed and Sealed this

Twenty-first Day of May, 1996

Attest:

BRUCE LEHMAN

*Attesting Officer*          *Commissioner of Patents and Trademarks*